(12) United States Patent
Guo et al.

(10) Patent No.: US 11,323,730 B2
(45) Date of Patent: May 3, 2022

(54) TEMPORALLY-OVERLAPPED VIDEO ENCODING, VIDEO DECODING AND VIDEO RENDERING TECHNIQUES THEREFOR

(71) Applicant: Apple Inc., Cupertino, CA (US)

(72) Inventors: Mei Guo, San Jose, CA (US); Jun Xin, Sunnyvale, CA (US); Yeping Su, Sunnyvale, CA (US); Hsi-Jung Wu, San Jose, CA (US); Alexandros Tourapis, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/561,478

(22) Filed: Sep. 5, 2019

(65) Prior Publication Data

US 2021/0076054 A1 Mar. 11, 2021

(51) Int. Cl.
*G01R 31/34* (2020.01)
*H02P 29/024* (2016.01)
*H01H 71/70* (2006.01)
*H04N 19/44* (2014.01)
*H04N 19/159* (2014.01)
*H04N 19/177* (2014.01)
*H04N 19/172* (2014.01)
*H04N 19/46* (2014.01)

(52) U.S. Cl.
CPC .......... *H04N 19/44* (2014.11); *H04N 19/159* (2014.11); *H04N 19/172* (2014.11); *H04N 19/177* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 6,498,816 B1 | 12/2002 | Easwar et al. | |
| 7,194,032 B1 | 3/2007 | Easwar et al. | |
| 7,490,344 B2 | 2/2009 | Haberman et al. | |
| 9,432,433 B2 | 8/2016 | Luby et al. | |
| 9,508,390 B2 | 11/2016 | Biderman et al. | |
| 9,900,629 B2 | 2/2018 | Su et al. | |
| 10,542,272 B1* | 1/2020 | Tran | H04N 19/46 |
| 2003/0138043 A1 | 7/2003 | Hannuksela | |
| 2006/0233245 A1 | 10/2006 | Chou et al. | |
| 2010/0046634 A1* | 2/2010 | Dai | H04N 21/4384 375/240.25 |

(Continued)

*Primary Examiner* — Edemio Navas, Jr.
(74) *Attorney, Agent, or Firm* — BakerHostetler

(57) ABSTRACT

Techniques for video exchange are disclosed in which a video source sends redundant copies of video coded at a given presentation time. A decoder may determine, from metadata stored with a first decoded frame, whether other decoded frames have been designated as correlated to the first decoded frame. If so, the decoder may fetch other decoding frames using time indicator values of other decoded frames in metadata stored with the first decoded frame. When other decoded frame(s) are found, the decoder may blend content of the first coded frame and the other decoded frame(s). The decoder may render the blended frame. When one such coded frame is an intra-coded frame, the proposed technique may alleviate beating artifacts by blending recovered data of the intra-coded frame with recovered data of another frame, which may be inter-coded.

29 Claims, 5 Drawing Sheets

(56) References Cited

U.S. PATENT DOCUMENTS

| | | | | |
|---|---|---|---|---|
| 2011/0149022 A1* | 6/2011 | Klebanov | ............ | H04N 13/189 |
| | | | | 348/42 |
| 2011/0274155 A1* | 11/2011 | Noh | ................ | H04N 19/587 |
| | | | | 375/240.01 |
| 2011/0296485 A1 | 12/2011 | Nilsson et al. | | |
| 2012/0195376 A1* | 8/2012 | Wu | ................ | H04N 19/105 |
| | | | | 375/240.12 |
| 2012/0293620 A1* | 11/2012 | Pahalawatta | ............ | H04N 19/80 |
| | | | | 348/43 |
| 2013/0301946 A1* | 11/2013 | Rossato | ............... | H04N 19/573 |
| | | | | 382/236 |
| 2014/0341293 A1* | 11/2014 | Chen | ................ | H04N 13/161 |
| | | | | 375/240.16 |
| 2015/0103926 A1* | 4/2015 | Hannuksela | ........ | H04N 19/159 |
| | | | | 375/240.26 |
| 2016/0219306 A1* | 7/2016 | Pettersson | .......... | H04N 21/6379 |
| 2016/0308958 A1* | 10/2016 | Navali | ................ | H04N 21/65 |
| 2017/0078681 A1 | 3/2017 | Coward et al. | | |
| 2017/0091557 A1* | 3/2017 | Wong | ................ | H04N 19/70 |
| 2017/0180744 A1* | 6/2017 | Deshpande | ............ | H04N 19/70 |
| 2017/0359596 A1 | 12/2017 | Kim et al. | | |
| 2020/0021869 A1* | 1/2020 | Tsukagoshi | ............ | H04N 19/30 |

\* cited by examiner

100

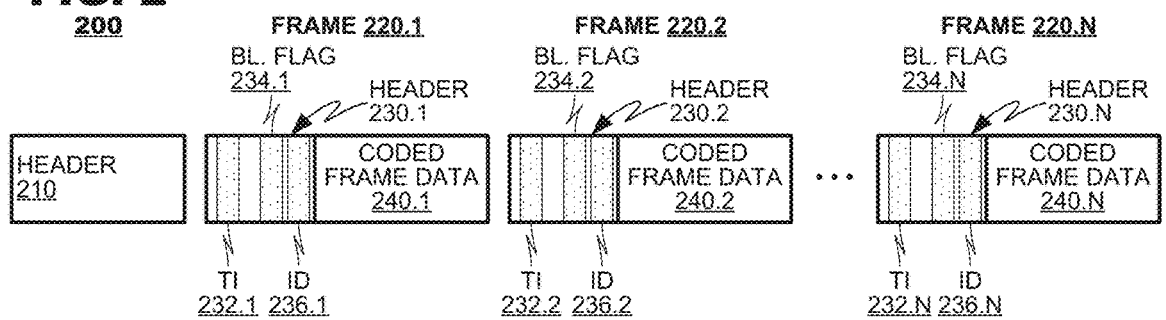
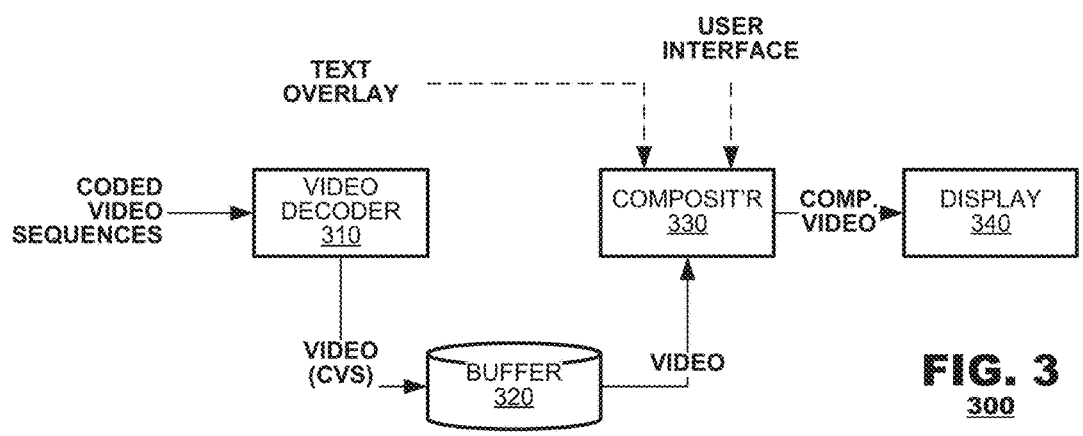

400

500

600

700

TEMPORALLY-OVERLAPPED VIDEO ENCODING, VIDEO DECODING AND VIDEO RENDERING TECHNIQUES THEREFOR

BACKGROUND

The present application relates to video coding and rendering techniques.

Many modern consumer devices support exchange of compressed video data. Typically, a source device performs bandwidth compression operations that exploit temporal and/or spatial redundancy in source video data and transmits a compressed representation of the source video to a receiving device. The receiving device decodes the compressed video data to generate and render recovered video.

Compression operations often generate coding dependencies among different frames of a video sequence. A first frame of the video sequence is coded on an intra-basis, which does not refer to any other frame of the video sequence. Subsequent frames, however, are coded using the first frame as a prediction reference (an inter-coding basis). Such techniques can achieve high-bandwidth compression but at a cost: If the first frame were lost through a transmission error, then neither the first frame nor the frames that rely on it as a prediction reference can be recovered without retransmission or another error mitigation technique.

Modern coding protocols often designate frames of a source video sequence for intra-coding at regular intervals, which provide resilience against transmission losses and mitigation of other errors. Designating frames for intra-coding, however, can introduce artifacts in recovered video data. Intra-coded frames are coded without reference to any other frame in a video sequence, which can cause them to have distinct display characteristics (e.g., frame brightness) as compared to other frames which are inter-coded. When frames are coded on an intra-basis at regular intervals (for example, once per second), then the discontinuities can appear as beating artifacts when recovered intra-coded frames are displayed among other recovered inter-coded frames. Such beating artifacts can impair perceived quality of exchanged video.

BRIEF DESCRIPTION OF THE DRAWINGS

FIG. 2 illustrates a coded video sequence according to an aspect of the present disclosure.

FIG. 3 is a functional block diagram of a receiving terminal according to an aspect of the present disclosure.

DETAILED DESCRIPTION

Aspects of the present disclosure provide techniques for improving perceived quality of decoded video. According to such techniques, a video source sends redundant copies of video coded for a given temporal instance in a media timeline. A decoder may determine, from metadata stored with a first decoded frame, whether other decoded frames have been designated as correlated to the first decoded frame. If so, the decoder may search for other decoding frames using a picture identifier of the first decoded frame. When other decoded frame(s) are found, the decoder may blend content of the first coded frame and the other decoded frame(s) at the common temporal instance. The decoder may render the blended frame. When one such coded frame is an intra-coded frame, the proposed technique may alleviate beating artifacts by blending recovered data of the intra-coded frame with recovered data of another frame, which may be inter-coded.

Figure 1:
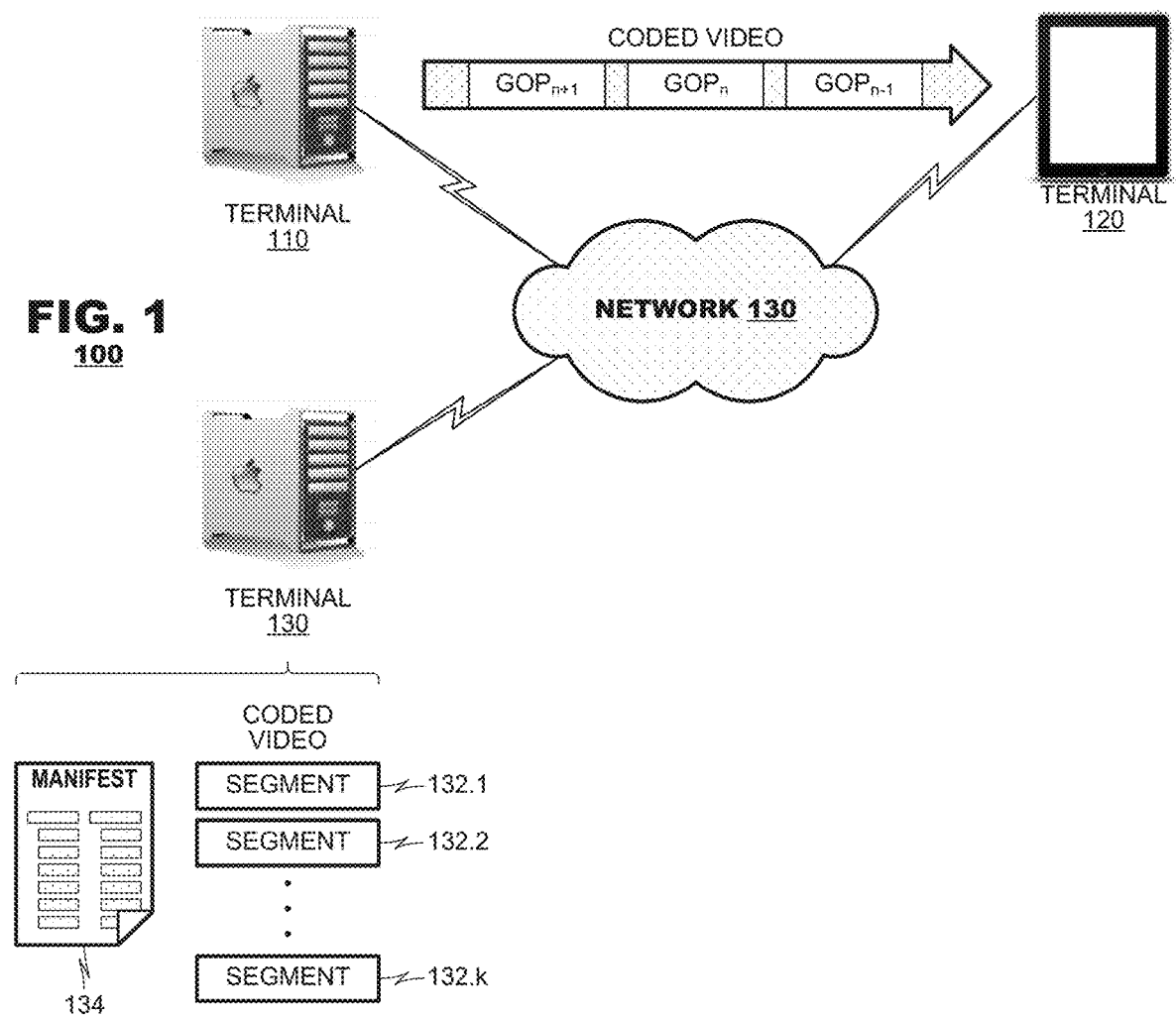
FIG. 1 is a block diagram of a system suitable for use with aspects of the present disclosure.

FIG. 1 is a block diagram of a networked system 100 suitable for use with aspects of the present disclosure. In the system 100, a pair of terminals 110, 120 may be provided for exchange of video data over a network 130. A source terminal 110 may supply video data, which has been coded for bandwidth compression, to a receiving terminal 120 where it is decoded and consumed by, for example, rendering the decoded frames on a display. Frames of coded video data may be grouped into collections, called "coded video sequences" for convenience, for transmission. The receiving terminal 120 may receive the coded video sequences, decode frames within them and render them.

In the example shown in FIG. 1, the source terminal 110 is illustrated as transmitting frames of coded video data in groups of pictures (often, "GOPs"). Many coding protocols, such as H.264/MPEG_AVC, HEVC (High Efficiency Video Coding), AV1 (AOMedia Video 1), etc., define protocols for defining GOPs and organizing frames within them. In this example, the source terminal 110 is illustrated transmitting three coded video sequences (GOPn-1, GOPn, and GOPn+1) to the receiving terminal 120 in order.

In other applications, coded video sequences may be built on other constructs. FIG. 1 illustrates another source terminal 130 that stores coded video data organized into segments 132.1, 132.2, ... 132.k. The source terminal 130 may supply coded video data to receiving terminals 120 according to the HTTP LiveStreaming protocols (commonly, "HLS"), MPEG-DASH protocols or the like, in which receiving terminals 120 issue GET requests for segments. Typically, such receiving terminals 120 may request a manifest file 134 from the source terminal 130, which identifies segments that are available for download from the source terminal 130. In many HLS applications, the source terminal 130 may store several codings of a common video item (not shown). The codings may differ from each other based on the coding bitrate used to represent video, the spatial resolution of video represented, frame rate, and the like. During operation, a receiving terminal 120 may toggle between the different representations in response to changing operating conditions at the receiving terminal 120. For example, a receiving terminal 120 may shift from one coding to another that represents video at a lower bitrate in response to a loss of available bandwidth at the receiving terminal 120. The receiving terminals 120 may identify segments from the manifest file 134 for download, request them via GET requests posted to the source terminal 130, and decode the segments when they are delivered. The segments also represent coded video sequences as discussed herein.

FIG. 2 illustrates a coded video sequence 200 according to an aspect of the present disclosure. As illustrated, the coded video sequence 200 may include a header 210, and a plurality of coded frames 220.1-220.N. The header 210 may contain metadata for the coded video sequence 200. Coded frames 220.1, 220.2, ..., 220.N each may include their own headers 230.1, 230.2, ..., 230.k and coded frame data 240.1, 240.2, ..., 240.k. The headers 230.1, 230.2, ..., 230.k may contain metadata about their respective frames.

As is relevant to the present discussion, frame headers 230.1, 230.2, ..., 230.k may contain data including respective time indicator 232.1, 232.2, ..., 232.k, blending flags 234.1, 234.2, ..., 234.k and, when the blending flags are set, an identifier of their correlated frames from other coded video sequences 236.1, 236.2, ..., 236.k. A frame's time indicator 232.1 may indicate a frame's 220.1 display order within a video sequence. A time indicator may be identified by a frame's picture order count (MPEG-coded video), order hint (AV1-coded video) or system timing information that represents a rendering time within a video presentation timeline. A blending flag 234.1 may indicate that a relationship exists between the frame 220.1 in a present coded video sequence 200 and another frame (not shown) from another coded video sequence (also not shown). The identifier 236.1 identifies a correlated frame (not shown) that occurs in a common temporal instance as the frame 220.1 to be blended with the frame 220.1. In an aspect, the identifier 236.1 may be a time indicator, indicating a location of the correlated frame within received coded video (not shown). Coded video data of each frame 220.1, 220.2, ... 220.N may be decoded by a receiving terminal and the metadata processed for blending operations discussed herein.

FIG. 3 is a functional block diagram of a receiving terminal 300 according to an aspect of the present disclosure. The terminal 300 may include a video decoder 310, a buffer 320, and a compositor 330. The video decoder 310 may receive a plurality of coded video sequences and decode them. The video decoder 310 may output reconstructed video of each coded video sequence to a buffer 320, where it may be stored until it is to be rendered. The compositor 330 may retrieve reconstructed video from the buffer and generate composited video therefrom. In an aspect, the compositor 330 may generate composed frames at respective temporal positions from frames of a plurality of coded video sequences. In other aspects the compositor 330 may integrate locally-generated visual elements, such as user interface elements and/or text overlays, into to composed frames.

Each coded video sequence may be coded according to a coding protocol, which determines how reconstructed video will be generated therefrom. When the video decoder 310 stores a reconstructed frame in the buffer 320, it may store the reconstructed frames with metadata including the frame's time indicator 232.1, blending flag 234.1 and identifier(s) of correlated frame(s) 236.1 (FIG. 2). When the compositor 330 determines to render a frame 220.1, it may reference the stored metadata to determine if the buffer 320 stores any other frames that are to be blended with the frame 220.1 into a composited frame.

Figure 4:
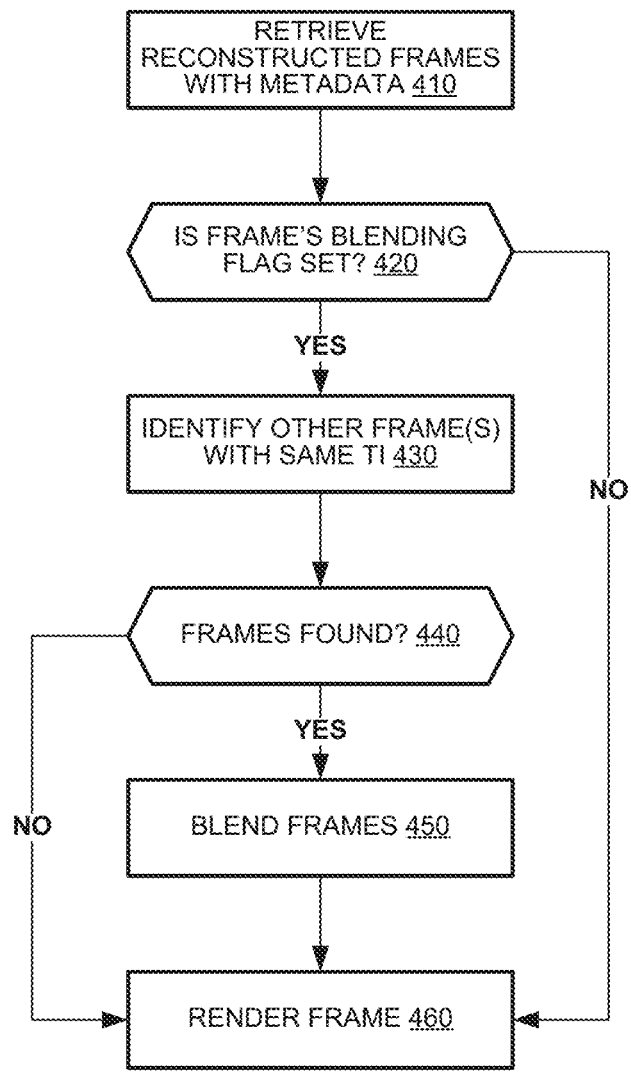
FIG. 4 illustrates a method according to an aspect of the present disclosure.

FIG. 4 illustrates a method 400 according to an aspect of the present disclosure. The method 400 may be performed by a compositor 330 (FIG. 3) within a decoding terminal. The method 400 may begin when a reconstructed frame is retrieved from a buffer (FIG. 3, 320). The method 400 may retrieve the reconstructed frame along with its metadata (box 410). The method 400 may determine whether the frame's blending flag is set to an ON state (box 420). If not, the method 400 may render the frame immediately (box 430).

If the method 400 determines that the frame's blending flag is set, the method 400 may identify other correlated frame(s) based on identifiers provided in the frame's metadata (box 430). If frames are found (box 440), the method 440 may blend content of the retrieved frame with content of the identified correlated frame(s) retrieved from the buffer (box 450). The blended frame may be rendered (box 460). If the method 400 does not find other frames in the buffer at box 440, the method 400 simply may render the retrieved frame (box 460).

The foregoing techniques are expected to smooth visual display artifacts that can arise during video coding. Individual coded video sequences 510, 520 may be initiated by an intra random access point (commonly, "IRAP") picture which, by design, has no correlation to other frames that precede the IRAP frame in coding order. This lack of correlation, however, can induce display discontinuities when a decoded IRAP frame is displayed in order after the frames that precede it. IRAP frames can appear at regular intervals during many coding applications, which causes a "beating" effect as they are displayed. Instantaneous decoder refresh frames and clean random access frames are examples of IRAP frames. Moreover, the foregoing techniques may find application to progressive intra refresh frames.

Blending operations are expected to alleviate such beating artifacts. Although a decoded IDR frame may be coded and decoded without reference to other frames that precede it in coding order, aspects of the present disclosure cause content of the IDR frame to be blended with content from another frame, which may be coded predictively with reference to other earlier-coded frames. In this manner, the beating contribution of an IDR frame may be reduced because it is blended with content of other frame(s).

Operation of the method 400 may accommodate a variety of different use cases where coded video segments are delivered to a receiving terminal. In a simple case, coded video segments may be delivered to a receiving terminal sequentially, one after the other. Such a use case is illustrated in FIG. 1 where GOPs n−1, n, and n+1 are delivered to a receiving terminal 120 sequentially. Some frames of an earlier GOP (say, $GOP_{n-1}$) may overlap frames of a subsequent GOP ($GOP_n$) along a timeline of the video.

Figure 5:
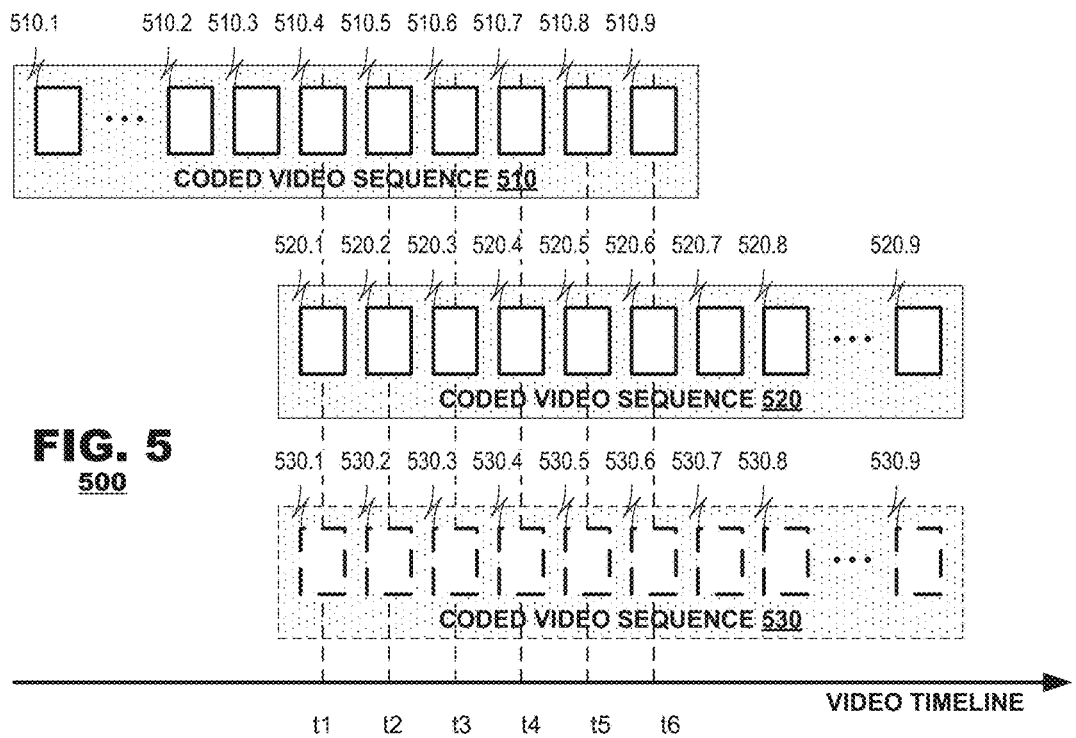
FIG. 5 illustrates relationships between exemplary frames according to an aspect of the present disclosure.

FIG. 5 illustrates temporal relationships between exemplary frames according to an aspect of the present disclosure. FIG. 5 illustrates first and second coded video sequences 510, 520, each containing respective frames. As illustrated, the first coded video sequence 510 contains frames 510.1-510.9, and the second coded video sequence 520 contains frames 520.1-520.9. In this example, frames 510.4-510.9 from the first coded video sequence 510 share common temporal instances with frames 520.1-520.6 along the video's timeline.

When the coded video sequences 510, 520 are delivered to a receiving terminal in sequence, the terminal may decode frames 510.1-510.9 of the first coded video sequence 510 before it decodes frames 520.1-520.9 of the second coded video sequence. The receiving terminal may buffer decoded frames 510.4-510.9 of the first coded video sequence 510 depending on their blending flags in metadata prior to rendering. During rendering, the receiving terminal may determine that the frames 510.4-510.9 from the first coded video sequence 510 are correlated to frames from another coded video sequence. As discussed in connection with FIG. 4, the receiving terminal may fetch other frames with identifiers of correlated frames from metadata of 510.4-510.9 stored in buffer and it may identify the frames 520.1-520.6 from the second coded video sequence 520 as corresponding to counterpart frames from the first coded video sequence 510. Through this discovery process, the receiving terminal may determine that individual frames 510.4-510.9 from the first coded video sequence 510 are to be blended with counterpart frames 520.1-520.6 from the second coded video sequence 520 prior to rendering.

In another aspect, correlated frames may be identified in supplemental enhancement information ("SEI") messages. Similarly, information regarding weight values may be identified in SEI messages. Such signaling techniques permit aspects of the disclosure discussed herein to be integrated into predecessor coding protocols.

Aspects of the present disclosure permit player devices to align video sequences dynamically without express signaling of timing information. In such an aspect, a player may perform feature analysis between frames of two video sequences to determine correlation between content. Such analyses may be performed, for example, based on techniques involving projections onto convex hulls. A player may project samples of frames from a sequence onto a selected dimension (for example, the horizontal or vertical axis) and compare vectors derived therefrom with vectors from frames of the other sequence. The comparison may identify frames from the two sequences that are highly-correlated to each other and timing information from the matching frames may be used as a basis for temporal alignment of the sequences' other frames.

These aspects of the present disclosure may provide a convenient technique for performing cross-fade scene cuts, where image content from a first scene is replaced gradually by image content from another scene. Cross-fade scene cuts can be difficult accommodate in conventional video coding schemes where a single coded frame must represent all cross-fade content at each temporal instance of a video sequence. By contrast, aspects of the present disclosure may accommodate such cross-fades by representing content of a first scene that will "fade away" in a first coded video sequence 510 and representing content of a second scene that will "fade in" in a second coded video sequence 520. The second coded video sequence 520 may begin with a coded instant decoder refresh frame (commonly, an "IDR" frame), which does not rely on previously-coded frames as prediction references. A receiving terminal may perform blending between the decoded frames of the first video sequence 510 and the decoded frames of the second video sequence 520 to achieve the cross-fade effect.

Video data is not always streamed to receiving terminals in a sequential manner. Video is subject to trick play rendering modes, which may cause playback to jump to designated locations within a video's timeline. For example, an operator may enter commands at a receiving terminal to jump to a designated chapter of a video, to fast-forward through a video sequence, or to perform a fast-reverse operation. When such playback operations are initiated, a receiving terminal may receive one coded video sequence (say, sequence 520) without receiving its predecessor sequence 510.

Aspects of the present disclosure accommodate such playback operations by rendering decoded frames when other correlated frames are unavailable. For example, at box 440 (FIG. 4), a method 400 may determine that other frames specified by time indicator of correlated frames are unavailable at a buffer notwithstanding assertion of a blending flag in a frame that is retrieved. For example, a buffer may store decoded frames 520.1-520.6 from the coded video sequence 520 but, due to a discontinuity in playback order, lack decoded frames 510.4-510.9 corresponding to a prior coded video sequence 510. In such a case, the method 400 may cause the decoded frames 520.1-520.6 to be rendered without blending.

Indeed, these aspects permit video rendering to occur gracefully in the presence of discontinuous playback operations. As discussed above, a given coded video sequence 520 may be rendered with a cross-fade effect when playback proceeds in decoding order continuously from a prior coded video sequence 510 to the coded video sequence 520. When a playback discontinuity occurs because, for example, playback jumps to the coded video sequence 520 without proceeding first through coded video sequence 510, frames from the coded video sequence 520 may be rendered without blending. Doing so permits a cross-fade effect to be omitted when decoded frames from coded video sequence 520 are rendered in response to a discontinuous playback event but permits the cross-fade effect to be preserved when the same decoded frames from the coded video sequence 520 are rendered during continuous playback. Such dynamic rendering capability would not be present in alternative schemes which represent content from both sides of a cross-fade scene cut within unitary coded frames.

While the foregoing discussion presented exemplary use cases in the context of blending between two coded video sequences 510, 520, the principles of the present discussion are not so limited. Aspects of the present disclosure accommodate blending across a greater number of coded video sequences as may be desired by operators of video coding systems. For example, FIG. 5 illustrates an exemplary third coded video sequence 530 that possesses frames 530.1-530.6 that have correlation to the frames 510.4-510.9 of the first coded video sequence 510 and frames 520.1-520.6 of the second coded video sequence 520.

Moreover, aspects of the present disclosure permit composition operations to occur at a receiving terminal upon dynamically-selected coded video sequences. In one such application, coded video sequences 520, 530 may be designed as alternatives to each other, which permits content from coded video sequence 520 to be rendered at a receiving terminal or content from coded video sequence 530 to be rendered but not both. Such applications may be useful when representing a given scene from two different visual perspectives that are alternatives to each other. When it is desired to represent video that transitions from content of coded video sequence 510 to coded video sequence 520, the two coded video sequences 510, 520 may be received by a receiving terminal, decoded, and rendered according to the techniques described in FIG. 4. Alternatively, when it is desired to represent video that transitions from content of coded video sequence 510 to coded video sequence 530, the two coded video sequences 510, 530 may be received by a receiving terminal, decoded, and rendered according to the same techniques. A video source (say sever 110, FIG. 1) may store a manifest file 134 that identifies the different coded video sequences 510-530 and their relationships to each other. Thereafter, whether due to operator control at a receiving terminal or data encoded in the manifest file 134, a receiving terminal may download designated segments 510 and either 520 or 530, and perform blending transitions between them as described in the foregoing discussion.

Frame blending may occur in a variety of ways. For example, given a set of N correlated frames $P_1$-$P_N$ at a common temporal instance, frame blending may perform a pixel-wise sum of frame content as follows:

$$P_{OUT}(x,y) = \Sigma_{i=1}^{N} w_i \cdot P_i(x,y), \text{ where}$$

$w_1, w_2, \ldots, w_N$ represent a set of weights assigned to each frame 1-N.

Frame weights w may be determined in a variety of ways. In a first aspect, weights simply may be defined within a receiving terminal, which alleviates the need to consume bandwidth of a coded video sequence to representing them. Alternatively, weights may be signaled expressly in coded frame data (FIG. 2), for example in a frame or slice header. A receiving terminal may retrieve weight data from frames that are identified during searches (box 430, FIG. 4), and apply them.

Weights may be derived implicitly from weights of other frames. For example, weights for one set of frames (say, frames 520.1-520.6 of one coded video sequence 520) may determine weights of other frames 510.4-510.9 that have same temporal instances. Weights w1-w6 may be provided for the frames 520.1-520.6 and a receiving terminal may calculate weights of the frames 510.4-510.9 from the other coded video sequence as $1-w_i$.

Weights may be derived from a temporal overlap between correlated frames between coded video sequences. In the example of FIG. 5, there are six frames 510.4-510.9 from coded video sequence 510 that overlap with frames 520.1-520.6 of coded video sequence 520. Weights may be derived for such overlapping frames with uniform weight step sizes to achieve a cross-fade, for example according to:

$$\text{For coded video sequence 510: } w_i = 1 - \frac{i}{l+1}$$

$$\text{For coded video sequence 520: } w = \frac{i}{l+1}$$

where l represents a number of overlapping frames between the coded video sequences.

Weights may be derived based on the number of coded frames that are available at a given temporal instance and relationship between frames and an IDR frame. In the example of FIG. 5, frame 520.1 represents an IDR frame of coded video sequence 520, and frames 520.2-520.9 have increasing temporal distances from the DR frame. Each frame 520.2-520.9 may be assigned a relative weight according to $$w_i = \frac{i}{l+1},$$

where where l represents a number of overlapping frames between the coded video sequences 510, 520, and i represents each frame's temporal distance from the IDR frame of the coded video sequence 520.

In another aspect, weights may be derived based on analysis of frame quality. A frame from one sequence may be assessed as having higher quality than a correlated frame from another sequence due to the number of bits used to code the frame, quantization parameters assigned respectively to the frames or metadata identifying frame quality. In an HLS or MPEG-Dash application, quality assessments may be derived from service tiers to which segments belong. In such a case, a frame with a "low" quality may be assigned a proportionally lower weight than a correlated frame that has a higher quality. Further, weights may be assigned in response to user input that specify threshold parameters for blending.

Other blending controls may be provided. For example, in an aspect, a source terminal may provide a blending mask (not shown) to a receiving terminal that identifies spatial areas of frames from one coded video sequence that should be blended with content of frames from other coded video sequence(s) and spatial areas of those frames that should not be so blended. A blending mask may identify content at a block, macroblock, or coding unit level within a frame based on a coding protocol used. Alternatively, the blending mask may designate regions of interest, for example, detected object(s) within image content (human faces, human bodies, other detected objects) that are to be blended and other that are not. In an embodiment where elements of correlated frames are designated not for blending, such elements may be coded at extremely low coding rates (for example, SKIP mode coding, coding with high quantization parameters), which effectively shifts bitrate budgets for coding to other elements of content that will be blended.

In another aspect, processing resources at a receiving terminal may influence how (or whether) blending is performed. A receiving terminal that has relatively low level of processing resources available to it because, for example, its processor(s) are heavily-utilized or because power limitations at the terminal cause the processor(s) to operate in a lower-complexity mode of operation, may determine to skip blending or limit the number of frames on which blending is performed.

In a further aspect, blending may be performed non-uniformly on different color components of video. For example, a receiving terminal may perform blending solely on luma components of image data represented in a YCbCr color space. In another example, blending may be performed solely on an I component of image data represented in the IPT or ICtCp color spaces.

In many coding applications, coded frames may have time indicators that are unique across a video sequence or have a modulus that sufficiently large to protect against events that would cause multiple frames stored in a buffer 320 (FIG. 3) to share a common time indicator. In such instances, an identifier 236.1 (FIG. 2) simply may identify the time indicator of a correlated frame. In other coding applications, however, time indicators may reset at more frequent intervals, for example, each time a GOP is defined in a coding sequence. Identifiers may be defined in other ways in such applications.

Figure 6:
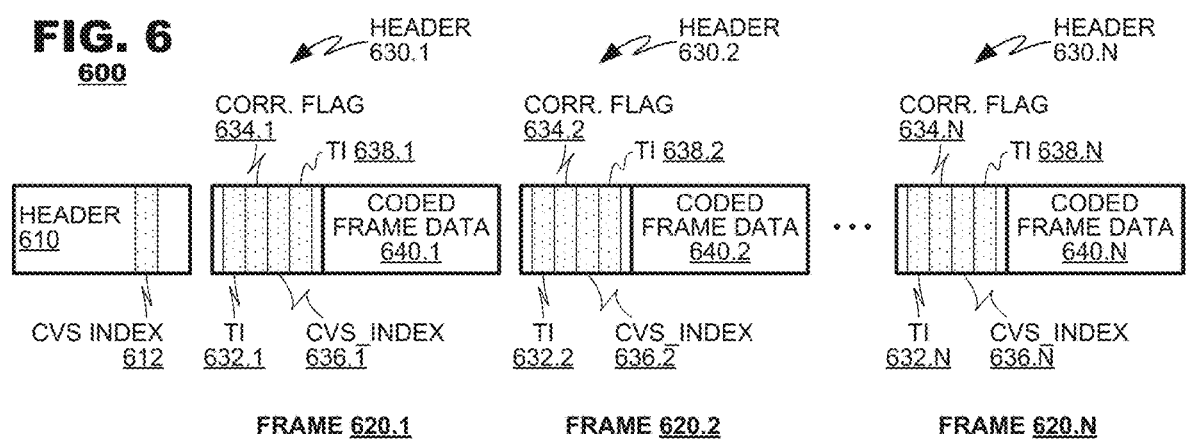
FIG. 6 illustrates a coded video sequence according to another aspect of the present disclosure.

FIG. 6 illustrates a coded video sequence 600 according to another aspect of the present disclosure. As illustrated, the coded video sequence 600 may include a header 610, and a plurality of coded frames 620.1-620.N. The header 610 may contain metadata for the coded video sequence 600. In an aspect, the header 610 also may include an index value 612 (shown as "cvs_index" in FIG. 6) that identifies the coded video sequence 600. The cvs_index values may be distinct among other coded video sequences (not shown), which permits a receiving terminal to associate frames 620.1-620.N, when they are decoded, to the coded video sequence 600 in which they were received.

Coded frames 620.1, 620.2, ..., 620.N each may include their own headers 630.1, 630.2, ..., 630.k and coded frame data 640.1, 640.2, ..., 640.k. The headers 630.1, 630.2, ..., 630.k may contain metadata about their respective frames. As is relevant to the present discussion, frame headers 630.1, 630.2, ..., 630.k may contain data including respective time indicator 632.1, 632.2, ..., 632.k, blending flags 634.1, 634.2, ..., 634.k, and, when a blending flag is enabled, parent identifiers 636.1, 636.2, ..., 636.k. Time indicator 632.2 may indicate a frame's display order within a video sequence. A blending flag 634.1 may indicate that a relationship exists between the coded frame 620.1 from one coded video sequence 600 and another coded frame (not shown) from another coded video sequence (also not shown). A parent identifier 636.1 may exist within a frame header 630.1 when the blending flag 634.1 is set; it may include a cvs_index and time indicator of correlated frame; the cvs_index values may identify another coded video sequence and the time indicator may identify correlated frame from the coded video sequence specified by cvs_index.

When coded video sequences 600 in the aspect of FIG. 6 are decoded, decoded video data of each frame (say, 620.1) may be buffered along with metadata identifying the cvs_index 612 of the coded video sequence 600 to which the frame belongs, the frame's time indicator 632.1, the frame's blending flag 634.1, and the frame's parent ID 636.1. Using the metadata structure of FIG. 6, the metadata may identify blended frames directly.

Consider the processing example of FIG. 5. A compositor 330 (FIG. 3) may process frames in picture count order, which in the example of FIG. 5, involves processing frames 510.1 to 510.3. Blending flags of frames 510.1-510.3 would not be set because there are no other correlated frames at the same temporal instances from other coded video sequences 520 or 530. When processing reaches frame 510.4, a compositor 330 may determine that its blending flag is set. The compositor 330 may identify from a parent ID 636 another correlated frame from a coded video sequence may be found that is to be blended with frame 510.4. The parent ID may identify the coded video sequence by its cvs_index, and identify the correlated frame within the coded video sequence by time indicator of correlated frame which the compositor 330 may retrieve decoded frame data of correlated frame to be blended. Thus, the metadata structure of FIG. 6 may simplify retrieval of data from a buffer 320 (FIG. 3).

Figure 7:
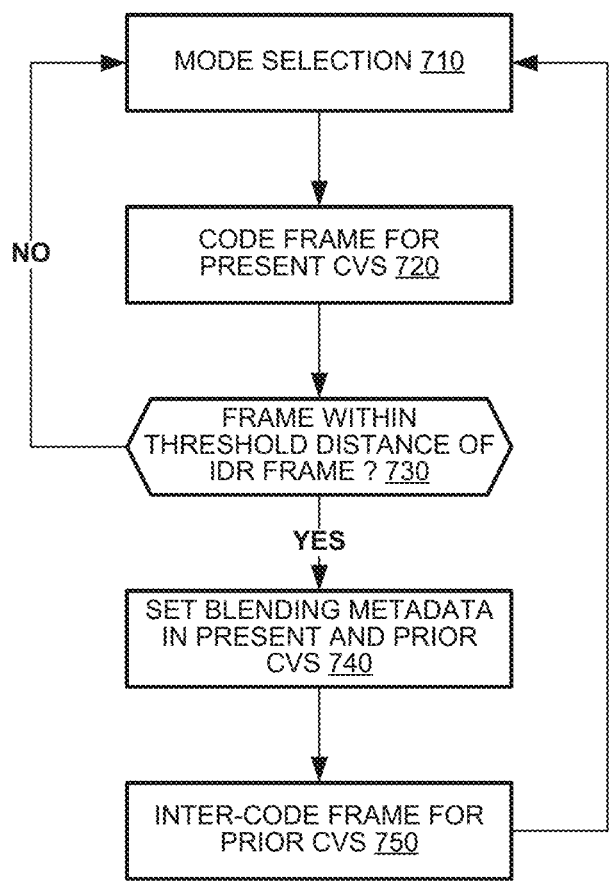
FIG. 7 illustrates a coding method according to an aspect of the present disclosure.

Other aspects of the present invention may cause an encoder to code video data redundantly. FIG. 7 illustrates a coding method 700 according to an aspect of the present disclosure. The method 700 may operate on each frame of a source video sequence. The method 700 may begin by performing a mode selection (box 710), selecting a coding mode for the frame. As discussed, coding modes may be based on intra-coding techniques or inter-coding techniques. The method 700 may code the input frame according to the selected mode (box 720) and coded video data may be placed into a code video sequence. In some cases, a frame may be selected for coding as an IDR frame, which causes a new coded video sequence to be created.

The method 700 may determine whether the current frame is within a threshold distance of an IDR frame (box 730). This may occur when the frame either is selected for coding as an IDR frame (for example, frame 520.1 of FIG. 5) or follows the IDR frame in coding order. When the method 700 determines that the frame is within a threshold distance of an IDR frame, the method 700 may set blending metadata for the frame both in the current coded video sequence (sequence 520 in the example of FIG. 5) and a prior coded video sequence (sequence 510). The method 700 also may code the frame for a prior coded video sequence by inter-coding (box 750).

Although the foregoing techniques have discussed coded video sequences that are based on GOPs that are defined by the occurrence of an IRAP frame, the principles of the present disclosure are not so limited. Other aspects of the disclosure find application with open GOPs that are do not begin with an IRAP frame. In fact, the principles of the present disclosure find application with any intra-coded frame that is coded without reference to other frames adjacent to it in a media rendering timeline where beating artifacts may arise.

The principles of the present disclosure find application with video frames in a variety of formats. For example, individual fields of interlaced frames in a first video sequence may be designated as having temporal correlation to interlaced fields of other video sequence(s). Moreover, the principles of the present disclosure find application with 360° video formats, point cloud content coded by video coding techniques, and the like. The principles of the present disclosure find application with natural video (e.g., video information captured by cameras) and synthetic video (e.g. computer-generated video).

The foregoing description has presented aspects of the present disclosure in the context of source terminals and receiving terminals. Typically, such terminals are provided as computer-controlled devices such as personal computers, notebook computers, tablet computers, smartphones, computer servers, personal media players, gaming platforms and/or dedicated videoconferencing equipment. Such devices typically operate using computer processors that execute programming instructions stored in a computer memory system, which may include electrical-, magnetic- and/or optical storage media. Alternatively, the foregoing techniques may be performed by dedicated hardware devices such as application specific integrated circuits, digital signal processors and/or field-programmable gate array. And. of course, aspects of the present disclosure may be accommodated by hybrid designs that employ both general purpose and/or specific purpose integrated circuit. Such implementation differences are immaterial to the present discussion unless noted hereinabove.

Moreover, although unidirectional transmission of video is illustrated in the foregoing description, the principles of the present disclosure also find application with bidirectional video exchange. In such a case, the techniques described herein may be applied to coded video sequences transmitted in a first direction between communication terminals and to coded video sequences transmitted in a second direction between the terminals. Each direction's coded video sequences may be processed independently of the other.

Although the disclosure has been described with reference to several exemplary aspects, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and aspects, the disclosure is not intended to be limited to the particulars disclosed; rather the disclosure extends to all functionally equivalent structures, methods, and uses such as are within the scope of the appended claims.

We claim:

1. A method, comprising:
   decoding a first decoded frame from a first encoding of a source frame of a video;
   determining, from metadata in the first encoding, whether the video contains another encoded frame having a common temporal instance with the first decoded frame;
   when the metadata indicates that the video contains another encoded frame having a common temporal instance with the first decoded frame,
      determining whether the other encoded frame has been decoded, and
      if so, blending content of corresponding pixels of the first decoded frame and a second decoded frame representing a decoding of the other encoded frame to produce a blended frame of blended pixels; and rendering the blended frame.

2. The method of claim 1, wherein the first decoded frame is a decoded intra-coded frame.

3. The method of claim 1, wherein separate coded video sequences are demarcated by respective intra random access point frames.

4. The method of claim 3, wherein the coded video sequences are respective Groups of Frames.

5. The method of claim 3, wherein the coded video sequences are respective segments identified on a manifest file.

6. The method of claim 1, further comprising, when no other decoded frames are designated by the metadata of the first decoded frame, rendering the first decoded frame.

7. The method of claim 1, wherein, when a third decoded frame is temporally correlated to the first decoded frame, the blending includes blending content of the first decoded frame, the other decoded frame, and the third decoded frame.

8. The method of claim 1, wherein the metadata is received from a video source with coded video data of the first decoded frame.

9. The method of claim 1, wherein the metadata is a supplemental enhancement information ("SEI") message.

10. The method of claim 1, wherein the metadata is a flag indicating the correlation.

11. The method of claim 1, wherein the metadata includes an identifier of a coded video sequence in which coded video data of the other decoded frame is received.

12. The method of claim 1, wherein the metadata includes a time indicator of a correlated frame which is to be blended with the first decoded frame.

13. A method, comprising:
   decoding coded video data of a plurality of coded video sequences, each demarcated by an instantaneous decoder refresh frame, each decoded frame from the coded video sequences having a respective time indicator, including
      decoding first decoded frames from a first encoding of source frames in the coded video data, and
      decoding second decoded frames from a second encoding the same source frames in the coded video data, wherein the first encoding of at least one frame of the source frames is intra-coded and the second encoding of the at least one frame is inter-coded;
   buffering the decoded frames and their respective time indicators;
   determining whether first decoded frame(s) from a first coded video sequence have common temporal instance with respective second decoded frame(s) from a second coded video sequence;
   blending decoded frame(s) from the first coded video sequence determined as having common temporal instance with respective decoded frame(s) from the second coded video sequence including the at least one source frame, wherein the blending is according to weighting factors; and
   rendering the blended frames in order according to their time indicators.

14. The method of claim 13, wherein correlation between frames is designated by metadata associated with the first decoded frame.

15. The method of claim 14, wherein the metadata is a flag indicating the correlation.

16. The method of claim 14, wherein the metadata includes an identifier of a coded video sequence in which coded video data of the other decoded frame is received.

17. The method of claim 14, wherein the metadata includes the time indicator of the other decoded frame.

18. The method of claim 13, wherein the weighting factors are indicated by received data of at least one coded video sequence.

19. The method of claim 13, wherein the weighting factors are derived from a number of frames from the coded video sequences that have correlation to each other.

20. The method of claim 13, wherein the weighting factors have uniform step size across a number of frames from the coded video sequences that have correlation to each other.

21. The method of claim 13, wherein the weighting factors are determined based on a number of coded video sequences that have frames correlated to each other.

22. The method of claim 13, wherein the blending performs a cross-fade effect between content of the coded video sequences.

23. The method of claim 13, wherein the coded video sequences are respective Groups of Frames.

24. The method of claim 13, wherein at least one of the decoded frames to be blended is a decoded intra-coded frame.

25. The method of claim 13, wherein the coded video sequences are respective segments identified on a manifest file.

26. A computer readable medium storing program instructions that, when executed by a processing device, cause the processing device to:
   decoding a first decoded frames from a first encoding of a source frames of a video;
   determining, from metadata in the first encoding, whether the video contains other encoded frames having a common temporal instance with the first decoded frames;
   when the metadata indicates that the video contains other encoded frames having a common temporal instance with the first decoded frames,
      determining whether the other encoded frames have been decoded, and
      if so, blending content of corresponding pixels of the first decoded frames and second decoded frames representing a decoding of the other encoded frames to produce blended frame(s) of blended pixels; and
   rendering the blended frame(s).

27. A computer readable medium storing program instructions that, when executed by a processing device, cause the processing device to:
   decode coded video data of a plurality of coded video sequences each demarcated by an instantaneous decoder refresh frame, each decoded frame from the coded video sequences having a respective time indicator, including
      decoding first decoded frames from a first encoding of source frames in the coded video data, and
      decoding second decoded frames from a second encoding the same source frames in the coded video data, wherein the first encoding of at least one frame of the source frames is intra-coded and the second encoding of the at least one frame is inter-coded;
   buffer the decoded frames and indications of their respective time indicators;
   determine, from metadata provided with the coded video sequences, that first decoded frame(s) from a first coded video sequence have common time indicators with respective second decoded frame(s) from a second coded video sequence;

blend decoded frame(s) from the first coded video sequence determined as having common time indicators and respective decoded frame(s) from the second coded video sequence including the at least one source frame, wherein the blending is according to weighting factors; and render the blended frames in order according to their time indicators.

28. An apparatus comprising:

a video decoder having an input for coded video data, a buffer to store decoded frames output by the video decoder, a compositor, to retrieve decoded video data for rendering, the compositor to:

decode first decoded frames from a first encoding of source frames in a first coded video sequence;

decode second decoded frames from a second encoding of the same source frames, wherein at least one frame of the first encoding and the second encoding of the source frames is intra-coded and the other of the first encoding and the second encoding of the at least one source frame is inter-coded;

determine, from metadata in the first and second encodings, whether any of the first decoded frames have been designated as having a same time indicator as any of the second decoded frames; and blend decoded frame(s) from the first encoding determined as having common temporal instance and respective decoded frame(s) from the second encoding according to weighting factors and the decoded frames' respective time indicators; and a display output to render the blended frames.

29. The method of claim 1, wherein the first decoded frame was decoded from the first encoding as an intra-coded frame and the second decoded frame was decoded from the other encoded frame as an inter-coded frame.

* * * * *